US009104364B2

(12) United States Patent
Engler et al.

(10) Patent No.: US 9,104,364 B2
(45) Date of Patent: Aug. 11, 2015

(54) GENERATION AND DISTRIBUTION OF STEERED TIME INTERVAL PULSE TO A PLURALITY OF HARDWARE COMPONENTS OF THE COMPUTING SYSTEM

(71) Applicant: International Business Machines Corporation, Armonk, NY (US)

(72) Inventors: Eberhard Engler, Tuebingen (DE); Guenter Gerwig, Simmozheim (DE); Willm Hinrichs, Holzgerlingen (DE); Barinjato Ramanandray, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 13/677,495

(22) Filed: Nov. 15, 2012

(65) Prior Publication Data
US 2014/0136877 A1 May 15, 2014

(51) Int. Cl.
G06F 1/04 (2006.01)
G06F 1/12 (2006.01)
G06F 5/06 (2006.01)
G06F 1/14 (2006.01)
G06F 1/32 (2006.01)
G06F 1/08 (2006.01)

(52) U.S. Cl.
CPC .. G06F 1/14 (2013.01); G06F 1/04 (2013.01); G06F 1/08 (2013.01); G06F 1/12 (2013.01); G06F 1/3203 (2013.01)

(58) Field of Classification Search
CPC ................................. G06F 1/3203; G06F 1/04
See application file for complete search history.

(56) References Cited

U.S. PATENT DOCUMENTS

| 4,903,251 | A | 2/1990 | Chapman |
| 5,041,798 | A * | 8/1991 | Moorman et al. ............ 331/1 A |
| 5,918,041 | A | 6/1999 | Berstis |
| 6,141,296 | A | 10/2000 | Progar |
| 7,451,339 | B2 | 11/2008 | Smith et al. |
| 7,681,064 | B2 | 3/2010 | Engler et al. |
| 8,121,050 | B2 | 2/2012 | Liu |
| 2005/0120258 | A1 | 6/2005 | Sohda |
| 2007/0058491 | A1 * | 3/2007 | Dahlen et al. ................... 368/46 |
| 2007/0260906 | A1 | 11/2007 | Corredoura |
| 2008/0072097 | A1 | 3/2008 | Check et al. |
| 2010/0086091 | A1 | 4/2010 | Park et al. |

FOREIGN PATENT DOCUMENTS

WO 2012141711 10/2012

OTHER PUBLICATIONS

GB Application No. 1319721.5 Examination Report, Apr. 24, 2014, 6 pages.

* cited by examiner

Primary Examiner — Jaweed A Abbaszadeh
Assistant Examiner — Gayathri Sampath
(74) Attorney, Agent, or Firm — DeLizio Law, PLLC (57) ABSTRACT

An indication of time that indicates at least one of the current day and the current time is received. It is determined that a raw interval pulse transmitted by a first oscillator should be adjusted based, at least partly, on the indication of time. In response to determining that the raw interval pulse should be adjusted, a steered time interval pulse is generated based, at least partly, on the raw time interval pulse and the indication of time. The steered time interval pulse is distributed to a plurality of hardware components.

17 Claims, 6 Drawing Sheets

GENERATION AND DISTRIBUTION OF STEERED TIME INTERVAL PULSE TO A PLURALITY OF HARDWARE COMPONENTS OF THE COMPUTING SYSTEM

BACKGROUND

Embodiments of the inventive subject matter generally relate to the field of computer architecture, and, more particularly, to the generation and distribution of a synchronized time source.

As the thirst for greater computing power has increased, the size of data centers has also increased. System and data center designers' desires for redundancy and fault tolerance have led to data centers being distributed over a wide geographic area. Furthermore, distributed computing and similar technologies have gained more importance. These types of applications have led to the development of technology to synchronize computing systems across widely dispersed geographic areas.

Similar developments have happened within computing systems themselves. System designers increase the number of processors and other components in a system to help increase computing power. Work may be distributed among the various components, and different components may finish the work allotted to them at different times. Thus, the system may reorder the completed work from the individual components, relying on timestamps that are synchronized between components to ensure the work is reordered properly.

SUMMARY

Embodiments of the inventive subject matter include a method in which an indication of time indicating at least one of the current day and current is received. It is also determined that a raw time interval pulse transmitted by a first oscillator of a computing system should be adjusted based, at least partly, on the indication of time. Responsive to said determination, a steered time interval pulse based, at least partly, on the raw time interval pulse and the indication of time is generated. The steered time interval pulse is distributed to a plurality of hardware components of the computing system that use the output for timestamps.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to the Network Time Protocol, other protocols for synchronizing system time over a network exist, such as the DAYTIME protocol and the Precision Time Protocol. In other instances, well-known instruction instances, protocols, structures and techniques have not been shown in detail in order not to obfuscate the description.

Time synchronization is important for many distributed applications. For example, a high performance database system may consist of multiple servers that each allows database inserts. In order to maintain database consistency, each database insert on one server is sent to the other servers. Each database insert contains a timestamp derived from a time source, allowing the other servers to process them in the proper order. If the time source for one server is out of sync, the other servers may process inserts originating from that server in the wrong order, leading to inconsistencies between the servers.

Some computing systems synchronize their time source with an accurate external source. This allows the systems to be synchronized with those in different geographic locations. For example, database servers in New York can be synchronized with database servers in Los Angeles. The Network Time Protocol (NTP) is a protocol developed for this purpose, and allows synchronization through various methods, including over the Internet. NTP can provide accuracy to 10 microseconds utilizing a pulse-per-second signal, or 100 milliseconds using other means.

To synchronize with using the NTP, a computing system first requests and receives time information from the NTP network by communicating with one or more NTP servers (hereinafter "NTP network"). The time information indicates the current date and time. The system calculates the difference between the current time as provided by the NTP network and the system time source. The difference between the time as provided by the NTP network and the system time source may be used to adjust the system time source directly by using an offset. For example, the system time source may use the output from an oscillator to increment a counter that represents the number of seconds from a certain point in time. The system may determine that the counter is five seconds behind the time indicated by the NTP network. The system can then use the time from the NTP network to generate an offset (of five seconds, in this case) which, when added to the value in the counter, produces the time as indicated by the NTP network.

Similar synchronization problems arise in computing systems with multiple processors. Not only should the timestamps be in sync between computing systems, they should also be in sync between the processors and other components. With some systems having synchronization goals of less than one millisecond, each individual component may correct for synchronization problems. Control code and extra hardware in each component increases space requirements and power consumption, and the more complexity the greater the chance of synchronization problems. Additionally, it may not be feasible to put the extra hardware in some components, leaving them with uncorrected timestamps.

In a computing system, each component to be synchronized can contain a time interval counter register. The time interval counter register represents the number of time intervals from a set point in the past, called an "epoch." For example, the epoch may be defined as Jan. 1, 1900, at 12:00 A.M. If the time intervals used were seconds, the value in the time interval counter register at any point in time would be the number of seconds between Jan. 1, 1900, at 12:00 A.M. and the current time. The actual time intervals used could be any time interval, including milliseconds and microseconds. The time interval counter functions as the time source for the corresponding component.

The computing system can also contain a time source oscillator, which is connected to each time interval counter register. The time source oscillator is designed to emit an electrical pulse, referred to as the raw time interval pulse, at a set interval. For example, if the time interval counter register represented the number of microseconds since the epoch, the time source oscillator may be designed to emit a pulse every microsecond. Each time the time source oscillator emits a pulse, the time interval counter register is incremented by one bit. Each raw time interval pulse represents a logical "1."

Oscillators generally have some inaccuracy. For example, ambient temperatures, humidity and vibrations can impact the rate at which an oscillator oscillates, varying the output. Therefore, over time, oscillator output frequency tends to drift. This oscillator drift is one factor that leads to the use of an offset to adjust a time interval counter register based on an external time source. Additionally, in may not be possible to manufacture an oscillator that oscillates at an exact frequency. For example, manufacturing imperfections may cause an oscillator that is supposed to oscillate at one megahertz to oscillate at 1.01 megahertz.

Components that correct for timing variations, such as oscillator frequency drift, can contain control code, a time interval counter register, a time interval offset register, and a corrected time source register. The control code receives time information from the NTP network as input. The control code uses the time information to calculate the difference between the time interval counter register and the current time as provided by the NTP network. This offset is referred to as the "computed local time interval offset" and the correction process is referred to as "steering." The control code writes the computed local time interval offset into the time interval offset register. The value in the time interval offset register is then added to the time interval counter register, and written into the corrected time source register. When a timestamp is requested, the component reads the value from the corrected time source register. Other components may not contain control code, and thus only contain a time interval counter register. Without the ability to calculate a time interval offset from an accurate time source, the value in the time interval counter register in these components may not be the same as other components.

A computing system can be designed to have a central internal time source, called a time source controller. Instead of each individual component correcting for oscillator drift, the time source controller provides a single, central point where the oscillator output can be corrected, outputting the corrected pulse to each component. Thus, individual components can be simplified, and the synchronization between components improves. Additionally, components that could not correct the oscillator output can now receive a corrected pulse, allowing them to be in sync with other components.

The output from the time source oscillator and the time information from the NTP network act as inputs to the time source controller. The time information from the NTP network can be used to generate a "steering rate." The steering rate is a rate that, when used to adjust the time source oscillator output, corrects for problems such as oscillator drift. The steering rate may be calculated by another hardware component, being provided to the time source controller as an input. The time source controller determines the difference between the steering rate and timing of the time source oscillator, and outputs a corrected pulse. This corrected pulse is referred to as the "steered time interval pulse."

Figure 1:
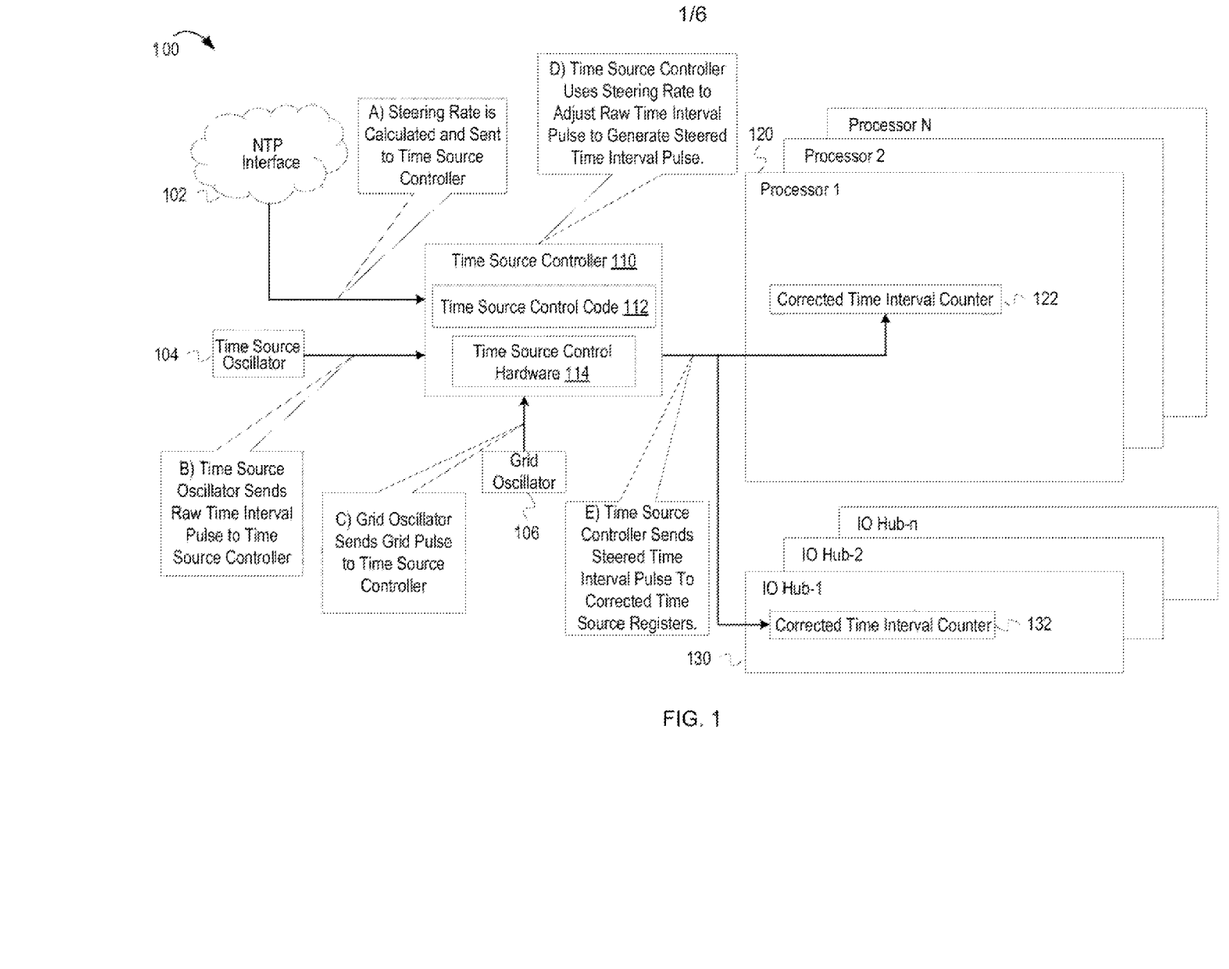
FIG. 1 depicts an example conceptual diagram illustrating selected components of a computing system interacting to generate a steered time interval pulse utilizing a centralized time source controller.

FIG. 1 depicts an example conceptual diagram illustrating selected components of a microprocessor system interacting to generate a steered time interval pulse utilizing a centralized time source controller. FIG. 1 depicts computing system 100 including an NTP interface 102, a time source oscillator 104, a grid oscillator 106, a time source controller 110, a set of processors 120, and a set of input-output hubs 130. The time source controller 110 includes time source control code (control code) 112 and time source control hardware (control hardware) 114. Each processor in the set of processors 120 includes a corrected time interval counter 122. Each input-output hub in the set of input-output hubs 130 includes a corrected time interval counter 132.

At stage A, the steering rate is sent from the NTP interface 102 to the time source controller 110. The NTP interface 102 communicates with servers in the NTP network in order to get an accurate time value. In some embodiments, the time source controller 110 itself will calculate the steering rate based on the time information obtained from the NTP interface 102. The steering rate can be calculated by reading the value from a corrected time interval counter and computing an offset using the time information as received by the NTP interface 102. The time source controller 110 can then calculate an updated steering rate by adjusting the current steering rate by the new offset. The time source controller 110 can adjust the current steering rate over a period of time to reduce the chances that the adjustment will impact an application using the corrected time value, as discussed below.

At stage B, the time source oscillator 104 sends a raw time interval pulse to the time source controller 110. The time source oscillator outputs a pulse at a rate equal to the individual time periods being counted since the epoch. For example, if the corrected time interval counter is defined to hold the number of microseconds since Jan. 1, 1900, the time source oscillator is designed to output a pulse every microsecond. In some embodiments, the time source oscillator is a high precision oscillator, designed to minimize oscillator drift. Even though the oscillator drift is minimized, it is not eliminated, and thus steering is still used. Additionally, even a high precision oscillator will not have the same accuracy as an atomic clock, which serves as the basis for the high precision NTP network.

At stage C, the grid oscillator 106 sends a grid pulse to the time source controller 110. The grid oscillator 106 oscillates at a frequency equal to or higher than that of the time source oscillator 104. For example, a time source oscillator 104 that outputs a pulse every microsecond operates at a frequency of one megahertz, whereas the grid oscillator 106 may operate in the gigahertz range. In some embodiments, the grid oscillator 106 may be the reference clock for the hardware. A reference clock may generate multiple oscillator outputs at varying frequencies as used by the hardware. One oscillator output generated by a reference clock can be the same speed as the clock rate of an individual processor. The reference clock output that is the same speed as the processor clock rate can be used as the grid oscillator 106. The grid oscillator 106 is used to define the individual delay intervals, discussed later, thus the higher the grid oscillator 106 frequency, the more precise the steering of the raw time interval pulse can be.

For example, if the grid oscillator 106 transmits a pulse every microsecond, the raw time interval pulse can be delayed in increments of one microsecond. The shorter the time between grid oscillator 106 pulses (or, stated another way, the higher the grid oscillator 106 frequency), the finer the adjustments to the raw time interval pulse can be. The finer the adjustments, the more transparent the adjustments are to anything using the corrected time interval count. For example, if the time source oscillator 104 transmits a pulse every second, an application that reads the corrected time interval twice, with the second read one and a half seconds after the first, should get two values that are different by one second. If a grid oscillator 106 only transmits a pulse every second and an application reads one value prior to an adjustment that delays the pulse an extra second, then reads a second value after the adjustment, the time interval values will not change. If the grid oscillator 106 transmits a pulse every microsecond, the time interval values read would differ by one microsecond short of the full difference, making the adjustment virtually unnoticeable to the application.

At stage D, the time source controller 110 uses the steering rate from the NTP interface 102 to steer the raw time interval pulse from the time source oscillator 104. The control code 112 receives the input from the NTP interface 102 and processes it into a form that is compatible with the control hardware 114. The control code 112 sets the control hardware 114 to adjust the raw time interval pulse forward or backwards. The raw time interval pulse can be adjusted in increments equal to the time between grid oscillator 106 pulses. The adjusted raw time interval pulse, or steered time interval pulse, is output by the control hardware 114.

At stage E, the time source controller 110 sends the steered time interval pulse to the corrected time interval counters 122 and 132 in the individual components of the system. The corrected time interval counters 122 and 132 can be registers that increment each time they receive a pulse from the time source controller 110. Components such as a processor in the set of processors 120 can use the time interval counter value as timestamps. Timestamps allow the computing system to synchronize various processes that occur on different processors in the processor set 120. For example, a software application can utilize the ability to execute multiple tasks at the same time on different processors and rely on the accuracy of the timestamps to put the results of the tasks back into the proper order. Other components that would not have the ability to correct the time interval value, such as the set of input-output hubs 132, now have a corrected time interval counter that is in sync with the other components.

Figure 2:
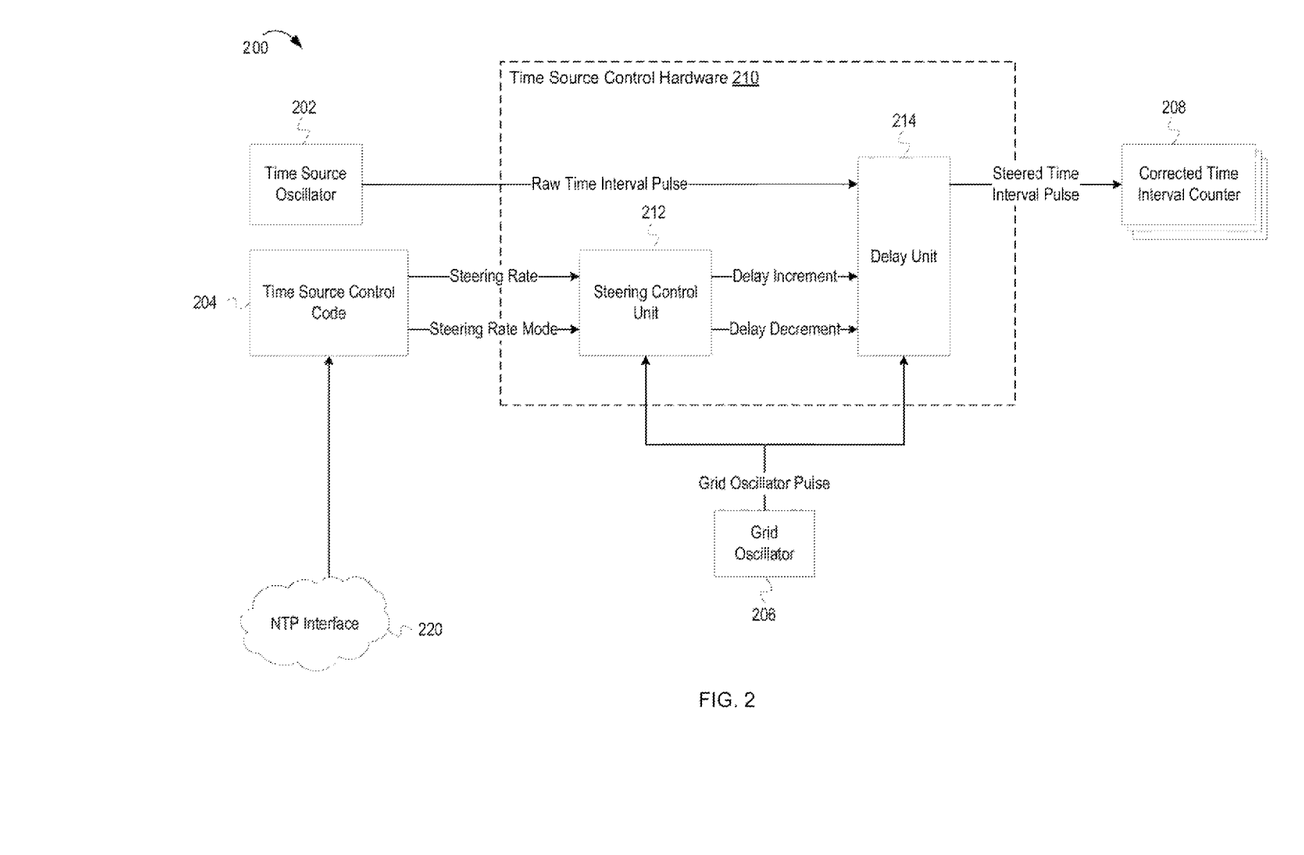
FIG. 2 depicts an example conceptual diagram of the control hardware and related functional units that generate a steered time interval pulse.

FIG. 2 depicts an example conceptual diagram of the control hardware and related functional units that generate a steered time interval pulse. FIG. 2 depicts a computing system 200, including a time source oscillator 202, control code 204, a grid oscillator 206, a set of one or more corrected time interval counters 208, control hardware 210 and an NTP interface 220. The control hardware 210 includes a steering control unit 212 and a delay unit 214.

The time source oscillator 202, control code 204, and grid oscillator 206 provide the inputs to the control hardware 210. The time source oscillator 202 provides the raw time interval pulse and the grid oscillator 206 provides the grid oscillator pulse. The control code 204 provides the steering rate and steering mode. The control hardware 210 has an output that goes to each one of the set of corrected time interval counters 208.

As discussed above, the control code 204 receives time information from an external time source such as the NTP interface 220. The control code 204 may get the steering rate from the NTP interface 220 or calculate it based on other information provided by the NTP interface 220. A steering rate can be expressed in terms of "parts per million." For example, a steering rate of two parts per million indicates that for every million intervals, the oscillator output to be steered should be shifted two intervals. This format is not particularly convenient to represent in hardware, so the control code 204 converts the steering rate to the reciprocal value. In the case of a two parts per million steering rate, the reciprocal is 500,000. Thus, if the grid oscillator 206 defined the intervals, a steering rate of two parts per million would be implemented by shifting the raw time interval pulse from the time source oscillator 202 once every 500,000 pulses from the grid oscillator 206. For the purposes of this discussion, "steering rate" will be used to refer to the actual steering rate and the reciprocal of the steering rate and distinctions between the two will be made when necessary.

After converting the steering rate into a form that is usable by the control hardware 210, the control code 204 sends the steering rate to the steering control unit 212. Oscillators can drift in ways that increase or decrease their frequency. Thus, the control code 204 also sends a steering rate mode to the steering control unit 212. The steering rate mode indicates to the steering control unit 212 to either increment the amount of delay or decrement the amount of delay. Decrementing the amount of delay advances the raw time interval pulse, compensating for a decrease in the time source oscillator 202 frequency or a time source oscillator frequency that is less than desired. Incrementing the amount of delay delays the raw time interval pulse, compensating for an increase in the time source oscillator 202 frequency or a time source oscillator frequency that is greater than desired.

As discussed above, the grid oscillator 206 provides a pulse that acts as the interval by which the raw time interval pulse is advanced or delayed. The steering control unit 212 uses the grid oscillator 206 pulse to determine when to increase or decrease the amount of delay. In other words, if the steering rate is two parts per million, the steering control unit 212 counts 500,000 grid oscillator 206 pulses and then sends a value to the delay unit 214. If the steering mode is set to increment the delay amount, the steering control unit 212 sends a value to the delay unit 214 to increment the delay. If the steering mode is set to decrement the delay amount, the steering control unit 212 sends a value to the delay unit 214 indicating to the delay unit 214 to decrement the amount of delay. The delay unit 214 uses the grid oscillator 206 pulse to count the number of delay intervals before issuing a steered time interval pulse. In other words, when the delay unit 214 receives a raw time interval pulse from the time source oscillator 202, it begins counting the grid oscillator 206 pulses. If the delay value is set to eight units, after eight grid oscillator 206 pulses the delay unit 214 issues a steered time interval pulse.

Each one of the set of corrected time interval counters 208 is incremented each time they receive a pulse from the delay unit 214, as described above.

Figure 3:
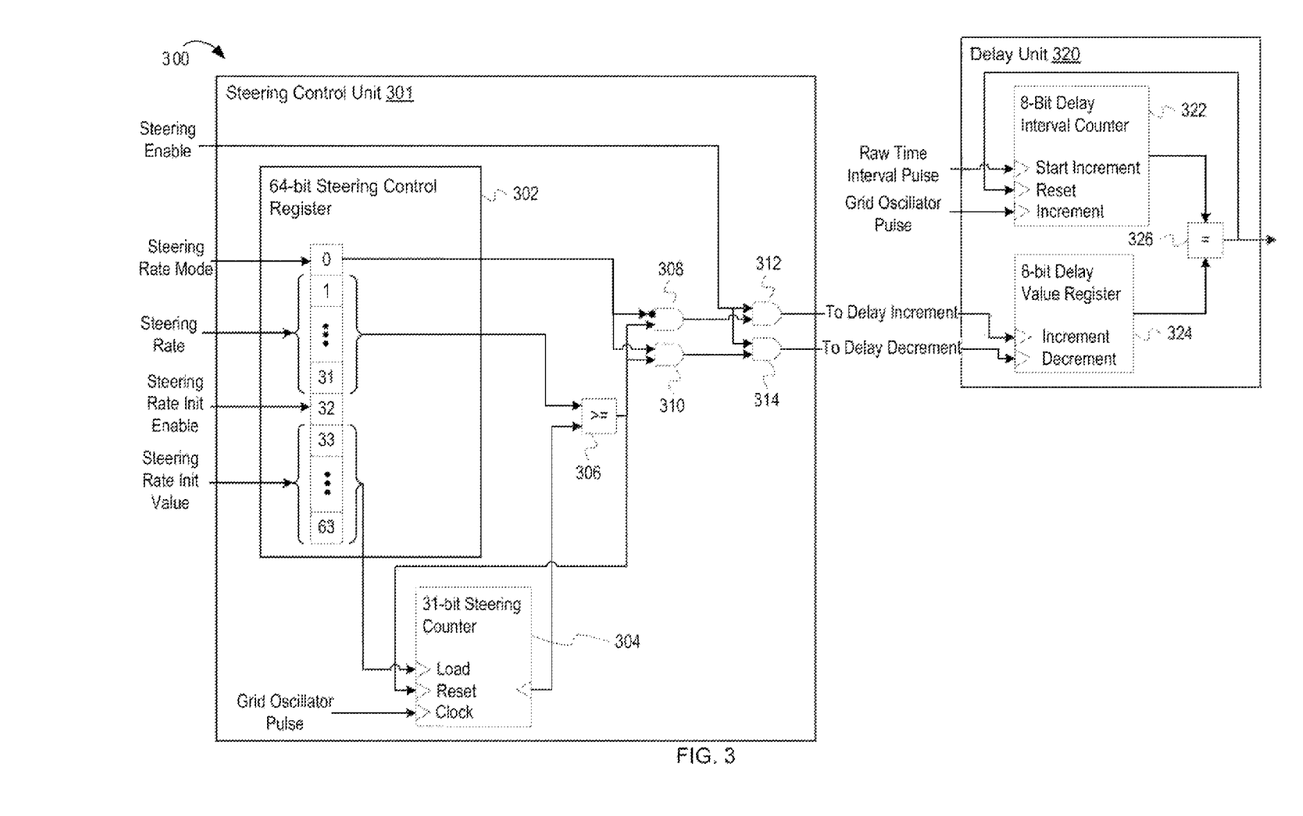
FIG. 3 depicts an example implementation of the control hardware for a time source controller.

FIG. 3 depicts an example implementation of the control hardware for a time source controller. FIG. 3 depicts the control hardware 300, including a steering control unit 301 and a delay unit 320. The steering control unit 301 include a 64-bit steering control register (steering control register) 302, a 31-bit steering counter (steering counter) 204, a comparison circuit 306, and four AND gates 308, 310, 312, and 314. The delay unit 320 includes an 8-bit delay interval counter (delay counter) 322, an 8-bit delay value register (register) 324 and comparison circuitry 326.

In the example implementation depicted in FIG. 3, there are five control inputs: steering enable, steering rate mode, steering rate, steering rate initialization enable, and steering rate initialization value. In embodiments discussed above, the steering rate mode and steering rate were implemented as two inputs to the steering control unit 300. In some embodiments, these two inputs, and any others, can be written into a register called the steering control register 302. The size of the steering control register 302 may be dictated by the number and size of the inputs, amount of physical space available, etc. In some embodiments, some inputs, such as the steering enable input in FIG. 3, can be individual inputs. There is one grid oscillator input connected to the steering counter 304.

The steering control unit 301 has two outputs. One output, labeled "To Delay Increment," sends a value indicating a logical "1" when the steering control determines the delay of the raw time interval pulse should be incremented. The other output, labeled "To Delay Decrement," sends a value indicating a logical "1" when the steering control determines the delay of the raw time interval pulse should be decremented.

The reciprocal of the steering rate is stored in bits one through thirty one of the steering control register 302. The outputs from the steering control register 302 corresponding to the steering rate value are connected to the comparison circuit 306. Each pulse of the grid oscillator increments the value in the steering counter 304. The steering counter 304 output is connected to the comparison circuit 306, providing the current steering counter 304 value to the comparison circuit 306. The comparison circuit 306 compares the steering counter 304 value with the steering rate value stored in the steering control register 302. When the value in the steering counter 304 is equal to or greater than the steering rate, the comparison circuit 306 outputs a logical "1." The comparison circuit 306 output is connected to the reset input of the steering counter 304 and the first AND gates 308 and 310. When the steering counter 304 receives a logical "1" from the comparison circuit 306, the steering counter 304 is reset to zero, unless the steering rate initialization enable bit is set to one. If the steering rate initialization enable bit is set to one and the steering control register 302 is written to, the steering counter 304 is reset to the steering rate initialization value stored in bits thirty three through sixty three of the steering control register 302.

The steering rate mode input, stored as a single bit value in the steering control register 302, indicates whether the delay should be incremented or decremented. The output from the steering control register 302 that corresponds to the bit value indicating the steering rate mode is connected to the first two AND gates 308 and 310. The AND gate 308 corresponding to the delay increment output has an inverter on the steering rate mode input. Thus, when the steering rate mode is set to 0, the steering rate mode input into the AND gate 308 corresponding to the delay increment output is a logical "1," and the steering rate mode input into the AND gate 310 corresponding to the delay decrement output is a logical "0." When the steering rate mode is set to a logical "1," the value for the inputs to the first AND gates 308 and 310 are flipped.

When the comparison circuit 306 outputs a logical "1," one of the first AND gates 308 and 310 has both inputs set to logical "1." For example, if the steering rate mode is set to a logical "0," the steering rate mode input into the top AND gate 308 is set to a logical "1," and the input from the comparison circuit 306 is set to a logical "1." Thus, the top AND gate 308 outputs a logical "1." The steering rate mode input into the bottom AND gate 310 is set to a logical "0," and thus the bottom AND gate 310 outputs a logical "0." When the steering rate mode is set to a logical "1," the AND gates 308 and 310 output a logical "0" and "1," respectively.

The steering enable input determines whether steering of the raw time interval pulse is enabled. The steering enable input is connected to the last two AND gates 312 and 314. When the steering enable input is set to a logical "0," the output of the last two AND gates 312 and 314 will always be a logical "0" regardless of what the other inputs are. Thus, while the steering enable input is set to a logical "0," both outputs are a logical "0," disabling steering of the raw time interval pulse.

Thus, to increment the delay, the steering rate mode is set to a logical "0" and the steering enable input is set to a logical "1." When the steering counter 304 value is equal to the steering rate, the comparison circuit 306 outputs a logical "1," making both inputs into the AND gate 308 corresponding with the increment delay output set to a logical "1." The output from the AND gate 308 corresponding to the increment delay output becomes a logical "1." Because the steering enable input is set to a logical "1," both inputs to the second AND gate 312 corresponding to the increment delay output are set to a logical "1," causing that AND gate 312 to output a logical "1."

In some scenarios, when the steering rate is modified, the delay value is incremented or decremented before the prior steering rate count is reached. For example, if the current steering rate of 1,000,000 is updated to 500,000 when the value of the steering counter 304 is 750,000, the comparison circuitry output becomes a logical "1." Thus, the delay value is incremented or decremented 250,000 delay intervals early. Or, if the current steering rate of 500,000 is updated to 1,000,000 when the value of the steering counter 304 is 250,000, the comparison circuitry does not become a logical "1." Thus, the delay value is incremented or decremented 500,000 delay intervals late. To minimize the impact of the latter scenario, the steering rate initialization value can be set to initialize the counter at the next reset. The steering counter 304 is reset immediately upon a write to the steering control register 302 if the steering rate initialization enable bit is set to one. For example, in the scenario in which the delay value is incremented or decremented 500,000 delay intervals late, the steering rate initialization value can be set to 750,000 and the steering rate initialization enable bit can be set to a logical "1" when the new steering rate value is written into the steering control register 302. This immediately sets the steering counter 304 to 750,000, thus allowing the increment or decrement to occur at the proper time.

The delay unit 320 has four inputs: the raw time interval pulse, the grid oscillator pulse, and the two outputs from the steering control unit 301, labeled "To Delay Increment" and "To Delay Decrement." The delay unit 320 has one output, the steered time interval pulse.

The register 324 holds a value indicating the number of grid oscillator pulses to delay the raw time interval pulse to generate the steered time interval pulse. When the register 324 receives a logical "1" to the register 324 increment input, the register 324 value is incremented by one. When the register 324 receives a logical "1" to the register 324 decrement input, the register 324 value is decremented by one. Because the register 324 is a fixed size, eight bits in this example, the value stored in the register 324 is also limited. The register 324 can be designed such that the value stored in the register 324 is reset to zero when the value stored in the register 324 reaches a multiple of the grid oscillator pulse to raw time interval pulse ratio. For example, if there are ten grid oscillator pulses to every raw time interval pulse, a delay of ten grid oscillator pulses is the same as no delay at all. Thus, the register 324 could be designed to reset to zero when the register 324 receives a logical "1" to the increment input if the current register 324 value is nine. The register 324 would also be designed such that it was set to a multiple of the grid oscillator pulse to raw time interval pulse ratio if decremented when the register 324 value was zero. In the previous example in which there are ten grid oscillator pulses to one raw time interval pulse, the register 324 could be set to nine if decremented when the register 324 value is zero.

The delay counter 322 is initially zero. When the delay counter 322 receives a pulse from the raw time interval pulse input, the delay counter 322 begins to count each grid oscillator pulse. In other words, after receiving a pulse from the raw time interval pulse input, the delay counter 322 is incremented by each grid oscillator pulse. When the value in the delay counter 322 is equal to the value in the register 324, the comparison circuitry 326 outputs a logical "1." This output from the comparison circuitry 326 is the steered time interval pulse. When the comparison circuitry 326 outputs a logical "1," the delay counter 322 is reset to zero and stops counting until the next raw time interval pulse.

Figure 4:
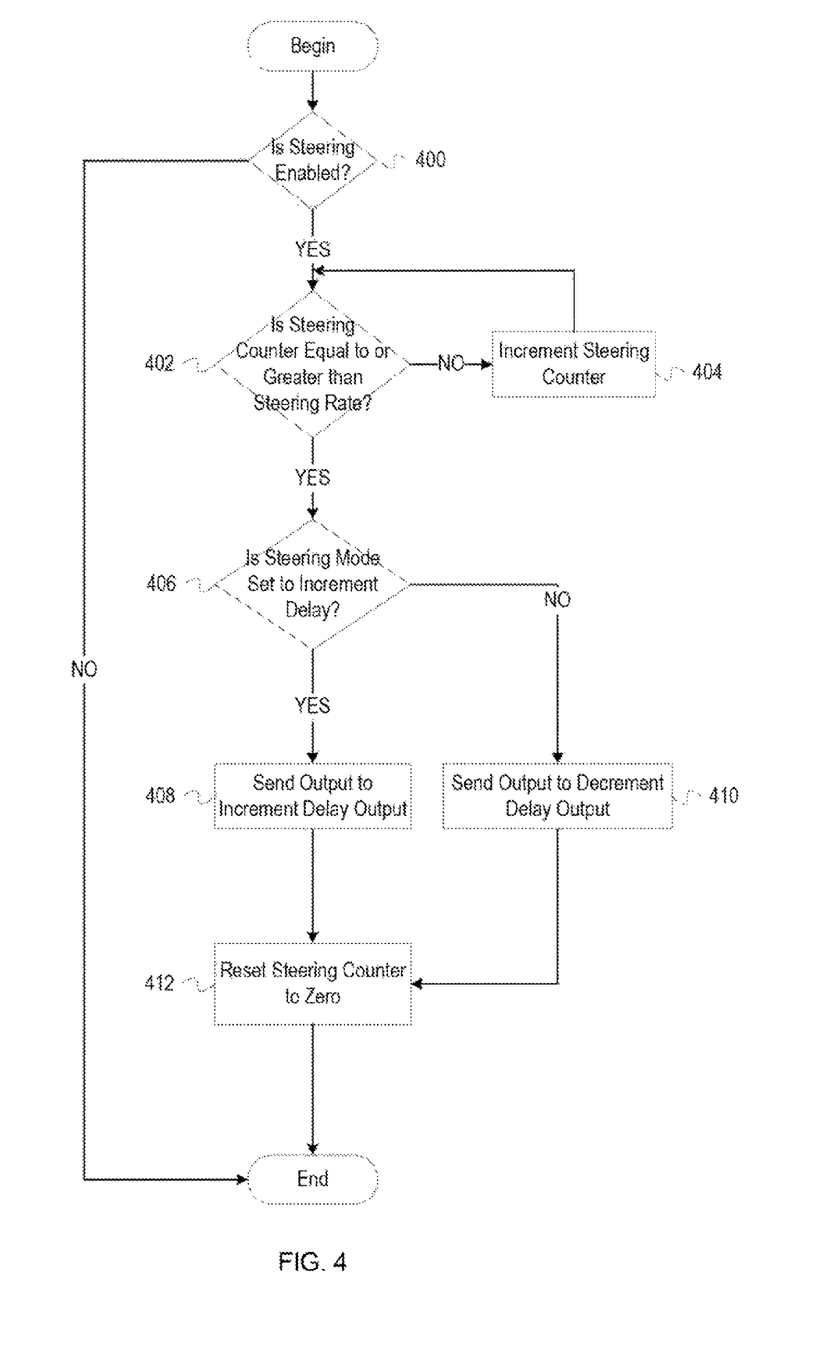
FIG. 4 depicts a flowchart of example operations showing how a steering control unit might increment or decrement the delay of a raw time interval pulse to generate a steered time interval pulse.

FIG. 4 depicts a flowchart of example operations showing how a steering control unit might increment or decrement the delay of a raw time interval pulse to generate a steered time interval pulse.

At block 400, the steering control unit determines whether steering is enabled or not. This can be done by checking the value of an input. The value of the input can be stored as a single bit in a register. If the steering control unit determines that steering is enabled, control then flows to block 402. If the steering control unit determines that steering is disabled, the process ends.

At block 402, a loop begins where the steering control unit increments a steering counter until the steering counter is equal to or greater than the steering rate. The comparison of the steering counter value and steering rate can be done by using hardware designed to compare two values that outputs a logical "1" when the values are equal or the steering counter is greater than the steering rate. If the steering counter is not equal to or greater than the steering rate, control then flows to block 404. If the steering counter is equal to or greater than the steering rate, control then flows to block 406.

At block 404, the steering counter is incremented. In some implementations, the steering counter can be incremented in response to an external source, such as an oscillator pulse. After incrementing the steering counter, control then flows back to block 402.

Control flowed to block 406 from block 402 if the steering control unit determined that the steering counter is equal to or greater than the steering rate. At block 406, the steering control unit determines whether the steering mode is set to increment the delay. The determination of whether the steering mode is set to increment the delay can be done by looking at the value of an input. The value of the input can also be stored as a single bit in a register. The steering control unit can be designed such that a logical "1" indicates that the steering mode is set to increment the delay, in which case a logical "0" indicates that the steering mode is set to decrement the delay. The steering control unit can also be designed such that a logical "0" indicates that the steering mode is set to increment the delay, in which case a logical "1" indicates that the steering mode is set to decrement the delay. If the steering control unit determines that the steering mode is set to increment the delay, control then flows to block 408. If the steering unit determines that the steering mode is not set to increment the delay, control then flows to block 410.

At block 408, the steering control unit sends a logical "1" to the output corresponding with incrementing the delay value. The logical "1" indicates to other hardware that the delay value should be incremented. Control then flows to block 412.

Control flowed to block 410 if the steering control unit determined that the steering mode was not set to increment the delay at block 406. At block 410, the steering control unit sends a logical "1" to the output corresponding with decrementing the delay value. The output value indicates to other hardware that the delay value should be decremented. Control then flows to block 412.

Control flowed to block 412 after the steering control unit output a value indicating that the delay value should be incremented or decremented at blocks 408 and 410, respectively. At block 412, the steering control unit resets the steering control value to the steering initialization value. Under normal operation, the steering initialization value is generally zero, unless the steering rate has recently been updated.

Figure 5:
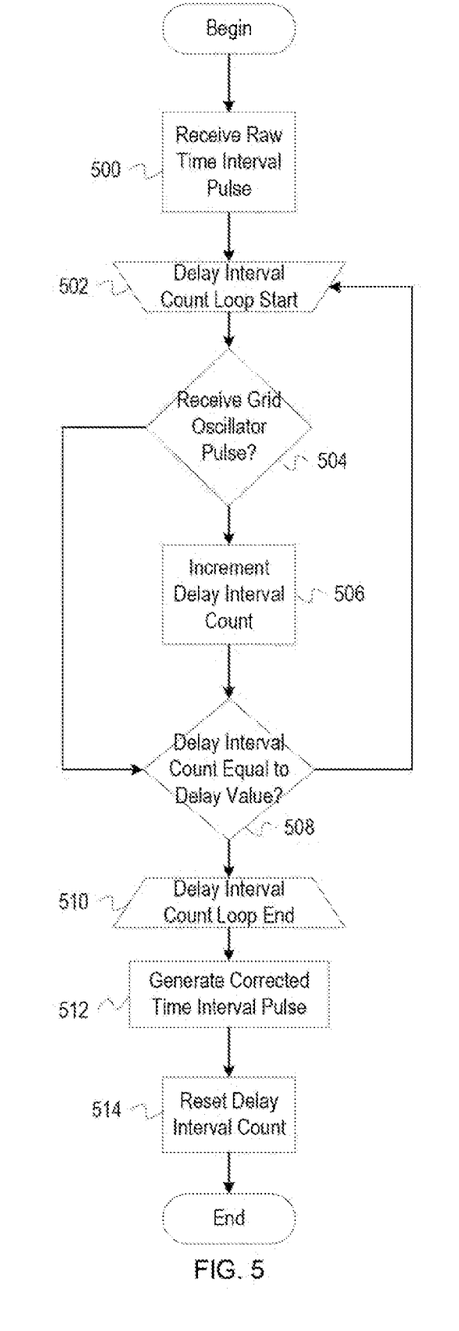
FIG. 5 depicts a flowchart of example operations showing how a delay unit might delay a raw time interval pulse to generate a steered time interval pulse.

FIG. 5 depicts a flowchart of example operations showing how a delay unit might delay a raw time interval pulse to generate a steered time interval pulse.

At block 500, the delay unit receives a raw time interval pulse from a time source oscillator. As discussed above, the time source oscillator transmits a pulse equal to the minimum unit of time used for the time value. Thus, if the time value tracks the number of microseconds since an epoch, the time source oscillator transmits a pulse every microsecond. Control then flows to block 502.

Block 502 is the beginning of the delay interval count loop. The delay interval count is initially zero. Each subsequent loop begins with the delay interval count one greater than the prior loop. Control then flows to block 504.

At block 504 the delay unit may receive a grid oscillator pulse. As discussed above, the grid oscillator pulse defines the minimum interval by which the raw time interval pulse can be delayed or advanced. The grid oscillator is of equal or higher frequency oscillator than the time source oscillator. If the delay unit receives a grid oscillator pulse, control then flows to block 506. If the delay unit does not receive a grid oscillator pulse, control then flows to block 508.

At block 506, the delay unit increments the delay interval count. The delay interval count is equal to the number of grid oscillator pulses received since the raw time interval pulse was received. Control then flows to block 508.

Control flowed to block 508 if the delay unit did not receive a grid oscillator pulse at block 504. Control also flowed to block 508 after the delay unit incremented the delay interval count at block 506. At block 508, the delay unit determines whether the delay interval count is equal to the delay value. The delay value is the number of delay intervals that each raw time interval pulse should be delayed to generate a steered time interval pulse. If the delay interval count is equal to the delay value, control then flows to block 510. If the delay interval count is not equal to the delay value, control then flows back to block 502, where the delay interval counter loop begins again.

At block 510, the delay interval count loop terminates. At termination, the delay interval count is equal to the delay value. Control then flows to block 512.

At block 512, the delay unit generates the steered time interval pulse. As discussed above, this can be a circuit generating a logical "1." For example, the delay unit may have circuitry to compare the delay interval count and the delay value at block 508. The circuitry may be designed such that the output is equivalent to a logical "1" when the delay interval count and the delay value are equal. This can then be transmitted to hardware counters or registers that are incremented by one when a logical "1" is received as an input. Control then flows to block 514.

At block 514, the delay interval count is reset to zero. This initializes the delay unit, allowing it to function properly after receiving another raw time interval pulse. In some implementations, resetting the delay interval count comprises resetting a hardware counter to zero.

As example flowcharts, the flowcharts depicted present operations in example order from which embodiments can deviate (e.g., operations can be performed in a different order than illustrated and/or in parallel). For example, in FIG. 5, block 508 may not be distinct operation. In the embodiment depicted in FIG. 3, the comparison circuitry 326 may have the values in the delay counter 322 and register 324 as constant inputs. Thus, the embodiment is constantly performing the comparison between the delay interval count and the delay value, as opposed to it being a distinct operation.

Many variations on the embodiments described herein are possible. Although NTP is used as an example protocol, there are other protocols available that serve the same or similar purpose, such as the DAYTIME protocol, Precision Time Protocol, and Time Protocol. New protocols may also be developed in the future. The use of NTP is merely meant to facilitate the discussion, and does not limit the inventive subject matter solely to the NTP, nor is the inventive subject matter limited to protocols in existence at the time the inventive subject matter was made. Also, the NTP is discussed mostly in terms of sending a value to a system, sometimes in response to a request from the system. NTP, and other protocols, may have different implementations that do not involve a request, nor send a single response. For example, the NTP supports a pulse-per-second implementation, in which the NTP server sends the system a pulse every second.

Additionally, the time source oscillator is discussed as transmitting a pulse at the minimum interval supported by the corrected time interval counter. Some implementations may use counters that are capable of supporting smaller intervals than the time source oscillator is designed to oscillate at. For example, a corrected time interval counter may be large enough to support microsecond intervals, but the time source oscillator may only transmit a pulse every ten microseconds.

The steering rate can be determined by various components in a system. For example, either the control hardware or control code can be designed to determine the steering rate. The steering rate can also be determined by the NTP interface or software running on a processor. These are not an exclusive list of variations, and many more are possible as will be appreciated by one skilled in the art.

Similarly, although the control code is depicted as being in the time source controller, the control code can exist in many different locations. For example, the control code can exist in the NTP interface, within another component in a system, or as a distinct component itself. The control code can be implemented in hardware, software, or firmware.

In FIG. 2, the control hardware 210 is depicted as having a single output that goes to each one of the set of corrected time interval counters 208. The control hardware can include an output for each one of the set of corrected time interval counters 208. Other outputs depicted in the figures that go to multiple components can be implemented at splitting to each component at various places, whether inside or outside of the boxes depicting functional units. Also, instead of splitting to each component, the outputs may be chained such that the output goes to one component, which has an output that goes to another component, etc.

With the discussion of FIG. 3, the implementation of the register 324 is described. The actual implementation can vary from that of the discussion, and thus the inventive subject matter is not limited to the implementations discussed. For example, the register 324 could have an additional input that would reset the register 324 value to zero. This would allow an external source to reset the register 324 value to zero as needed to keep the register 324 value from overflowing. This would provide added flexibility by removing the hardware reliance on a specific ratio between the grid oscillator pulse and raw time interval pulse. Thus, different pulse timings could be used with the same delay unit 320 hardware. Additional hardware could be included in the delay unit that determines an appropriate time to reset the register 324 value as well.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium does not include transitory, propagating signals.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
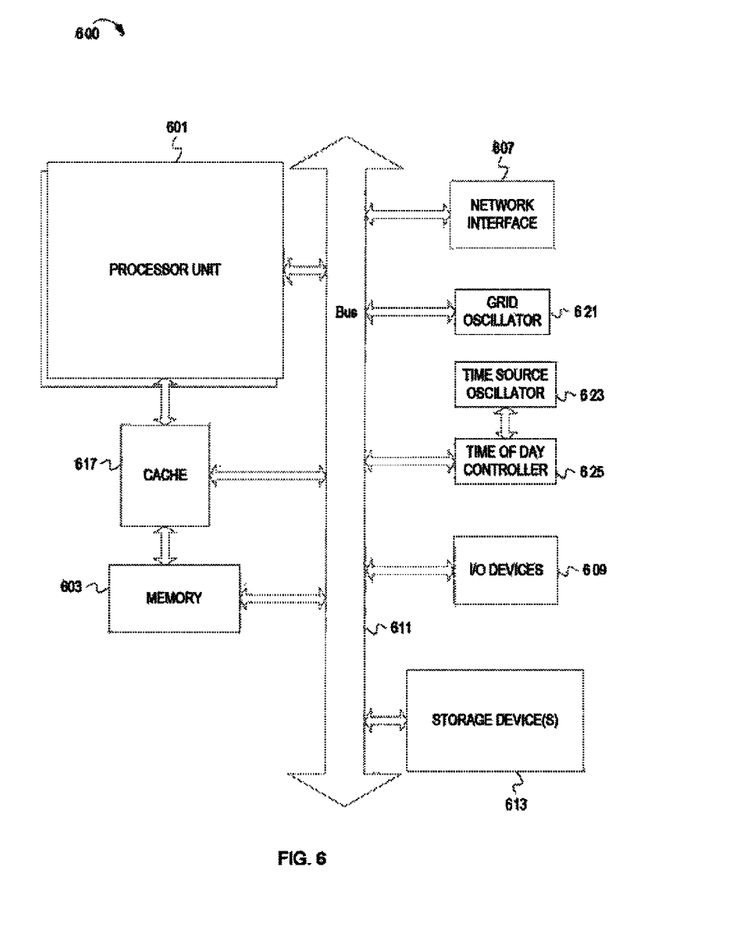
FIG. 6 depicts an example computing system with a time source controller.

FIG. 6 depicts an example computing system with a time source controller. A computing system includes a processor unit 601 (possibly including multiple processors, multiple cores, multiple nodes, and/or implementing multi-threading, etc.). The computing system includes memory 603. The memory 603 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computing system also includes a bus 611 (e.g., PCI, ISA, PCI-Express, Hyper Transport® bus, InfiniBand® bus, NuBus bus, etc.), I/O devices 609 (e.g., keyboard, mouse, monitor, microphone, speaker, etc.), a network interface 607 (e.g., an ATM interface, an Ethernet interface, a Frame Relay interface, SONET interface, wireless interface, etc.), a cache 617 (e.g., a direct mapped cache, a 2-way set associative cache, a fully associative cache, etc.), a grid oscillator 621, a time source oscillator 623, a time source controller 625 and a storage device(s) 613 (e.g., optical storage, magnetic storage, etc.). The cache 617 may be a lower level cache (e.g., L1 cache embodied in a processor) or a higher level cache (e.g., L2 cache, L3 cache, etc.). The time source controller 625 embodies functionality to implement embodiments described above. The time source controller 625 functions as described above, utilizing a steering rate provided by or derived from information provided by an external time source to adjust a pulse from the time source oscillator 623. Any one of these functionalities may be partially (or entirely) implemented in hardware and/or on the processing unit 601. For example, the functionality may be implemented with an application specific integrated circuit, in logic implemented in the processing unit 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601, storage device(s) 613, network interface 607, cache 617, and I/O devices 609 are coupled to the bus 611. Although illustrated as being coupled to the bus 611, the memory 603 may be coupled to the processor unit 601.

While the embodiments are described with reference to various implementations and exploitations, it will be understood that these embodiments are illustrative and that the scope of the inventive subject matter is not limited to them. In general, techniques for computer architecture design as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:

1. A method comprising:
   writing an indication to a steering control register, wherein the indication indicates at least one of whether the adjusting of the raw time interval pulse is enabled, whether the adjusting of the raw time interval pulse comprises delaying the raw time interval pulse or advancing the raw time interval pulse, a steering rate, the reciprocal of the steering rate, or an initial value for a counter, wherein advancing the raw time interval pulse can be decreasing a delay of the raw time interval pulse;
   receiving an indication of time, wherein the indication indicates at least one of the current day and the current time;

determining that a raw time interval pulse transmitted by a first oscillator of a computing system should be adjusted based, at least partly, on the indication of time;

responsive to said determining that the raw time interval pulse transmitted by the first oscillator of the computing system should be adjusted, generating a steered time interval pulse based, at least partly, on the raw time interval pulse and the indication of time, wherein said generating the steered time interval pulse comprises:

receiving a first indication of a grid oscillator pulse from a second oscillator;

responsive to said receiving the first indication of the grid oscillator pulse from the second oscillator, incrementing a steering counter, wherein the value hosted in the steering counter is the steering counter value;

determining that the steering counter value hosted in the steering counter is equal to or greater than one of the steering rate and the reciprocal of the steering rate; and responsive to said determining that the steering counter value hosted in the steering counter is equal to or greater than one of the steering rate and the reciprocal of the steering rate, transmitting an indication indicating one of incrementing a delay value and decrementing a delay value; and distributing the steered time interval pulse to a plurality of hardware components of the computing system.

2. The method of claim 1, wherein the indication of time is received from a source external to the computing system.

3. The method of claim 1, wherein the indication of time further comprises at least one of a pulse per second value and a steering rate.

4. The method of claim 1, wherein said generating the steered time interval pulse further comprises generating an output equivalent to the raw time interval pulse after being synchronized with the indication of time.

5. The method of claim 1 further comprising determining the steering rate based, at least in part, on the indication of time.

6. The method of claim 1, wherein said generating the steered time interval pulse further comprises:

receiving the indication indicating one of incrementing a delay value and decrementing a delay value;

responsive to receiving the indication indicating the one of incrementing the delay value or decrementing the delay value, incrementing a delay value register or decrementing the delay value register;

responsive to receiving an indication of the raw time interval pulse and receiving a second indication of a grid oscillator pulse from the second oscillator, incrementing a delay interval counter;

determining that the delay value is equal to the delay interval counter value; and responsive to said determining that the delay value is equal to the delay interval counter value, transmitting the steered time interval pulse.

7. A computer program product comprising:

a computer readable storage medium having computer usable program code embodied therewith, the computer usable program code comprising computer usable program code to:

write an indication to a steering control register, wherein the indication indicates at least one of whether the adjusting of the raw time interval pulse is enabled, whether the adjusting of the raw time interval pulse comprises delaying the raw time interval pulse or advancing the raw time interval pulse, a steering rate, the reciprocal of the steering rate, or an initial value for a counter, wherein advancing the raw time interval pulse can be decreasing a delay of the raw time interval pulse;

receive an indication of time, wherein the indication indicates at least one of the current day and the current time;

determine that a raw time interval pulse transmitted by a first oscillator of a computing system should be adjusted based, at least partly, on the indication of time;

responsive to a determination that the raw time interval pulse transmitted by the first oscillator of the computing system should be adjusted, generate a steered time interval pulse based, at least partly, on the raw time interval pulse and the indication of time, wherein the computer usable program code to generate the steered time interval pulse comprises computer usable program code to:

receive a first indication of a grid oscillator pulse from a second oscillator;

responsive to reception of the first indication of the grid oscillator pulse from the second oscillator, increment a steering counter, wherein the value hosted in the steering counter is the steering counter value;

determine that the steering counter value hosted in the steering counter is equal to or greater than one of the steering rate and the reciprocal of the steering rate; and responsive to a determination that the steering counter value hosted in the steering counter is equal to or greater than one of the steering rate and the reciprocal of the steering rate, transmit an indication indicating one of incrementing a delay value and decrementing a delay value; and distribute the steered time interval pulse to a plurality of hardware components of the computing system.

8. The computer readable storage medium of claim 7, wherein the indication of time is received from a source external to the computing system.

9. The computer readable storage medium of claim 7, wherein the indication of time further comprises at least one of a pulse per second value and a steering rate.

10. The computer readable storage medium of claim 7, wherein the computer usable program code to generate the steered time interval pulse comprises computer usable program code to generate an output equivalent to the raw time interval pulse after being synchronized with the indication of time.

11. The computer readable storage medium of claim 7, wherein the computer usable program code is further configured to determine the steering rate based, at least in part, on the indication of time.

12. The computer readable storage medium of claim 7, wherein the computer usable program code to generate the steered time interval pulse further comprises computer usable program code to:

receive the indication indicating incrementing a delay value and decrementing a delay value;

responsive to receiving the indication indicating the one of incrementing the delay value or decrementing the delay value, increment a delay value register or decrement the delay value register;

responsive to reception of an indication of the raw time interval pulse and receiving a second indication of a grid oscillator pulse from the second oscillator, increment a delay interval counter;

determine that the delay value is equal to the delay interval counter value; and responsive to determination that the delay value is equal to the delay interval counter value, transmit the steered time interval pulse.

13. An apparatus comprising:

a first oscillator configured to transmit a raw time interval pulse at regular or near regular intervals;

a time source controller coupled with the first oscillator, the time source controller configured to:

receive an indication of time, wherein the indication indicates at least one of the current day and the current time;

determine that the raw time interval pulse should be adjusted based, at least partly, on the indication of time;

responsive to a determination that the raw time interval pulse should be adjusted, generate a steered time interval pulse based, at least partly, on the raw time interval pulse and the indication of time;

distribute the steered time interval pulse to a plurality of hardware components of the computing system;

the time source controller comprising, a steering counter configured to host a count of grid oscillator pulses received from a second oscillator;

a steering control register configured to host indications of at least one of whether the adjusting of the raw time interval pulse is enabled, whether the adjusting of the raw time interval pulse comprises delaying the raw time interval pulse or advancing the raw interval pulse a steering rate, the reciprocal of the steering rate or an initial value for the steering counter, wherein advancing the raw time interval pulse can be decreasing a delay of the raw time interval pulse; and     a comparison circuit coupled to the register and the counter, configured to determine whether a first value is greater than or equal to a second value and output a value indicating that the first value is greater than or equal to the second value; and one or more corrected time interval counters coupled with the time source controller, configured to host a time value based, at least in part, on the output from the time source controller.

14. The apparatus of claim 13 further comprising the second oscillator, wherein the second oscillator is configured to transmit the grid oscillator pulse at regular or near regular intervals, wherein the second oscillator has a frequency equal to or greater than the first oscillator.

15. The apparatus of claim 14, wherein the time source controller further comprises:

a delay value register configured to host a delay value, increment the delay value responsive to receiving an indication to increment the delay value, and decrement the delay value responsive to receiving an indication to decrement the delay value, wherein the delay value indicates a number of intervals, wherein the intervals correspond to the transmission of a grid oscillator pulse from the second oscillator;

a delay interval counter configured to host a count of grid oscillator pulses received from the second oscillator responsive to receiving a raw time interval pulse from the first oscillator; and a comparison circuit coupled to the delay value register and delay interval counter, the comparison circuit configured to determine whether a first value is equal to a second value and output a value indicating that the first value is equal to the second value.

16. The apparatus of claim 13 further comprising an interface to an external time source, the interface configured to receive an indication of time.

17. The apparatus of claim 13, wherein the indication of time further comprises at least one of a pulse per second value and a steering rate.

* * * * *